US010075577B2

(12) United States Patent
Ricket

(10) Patent No.: US 10,075,577 B2
(45) Date of Patent: Sep. 11, 2018

(54) METHOD AND SYSTEM FOR REMOTE MANAGEMENT OF ACCESS TO DEVICES

(71) Applicant: PayJoy Inc., Saratoga, CA (US)

(72) Inventor: Douglas James Ricket, Saratoga, CA (US)

(73) Assignee: PAYJOY, INC., San Francisco, CA (US)

( * ) Notice: Subject to any disclaimer, the term of this patent is extended or adjusted under 35 U.S.C. 154(b) by 0 days.

(21) Appl. No.: 14/856,876

(22) Filed: Sep. 17, 2015

(65) Prior Publication Data

US 2016/0205235 A1    Jul. 14, 2016

Related U.S. Application Data

(60) Provisional application No. 62/101,576, filed on Jan. 9, 2015.

(51) Int. Cl.
| | |
|---|---|
| *G06Q 20/00* | (2012.01) |
| *H04M 1/725* | (2006.01) |
| *G06Q 20/42* | (2012.01) |
| *H04M 15/00* | (2006.01) |
| *G06Q 20/32* | (2012.01) |
| *G06Q 20/20* | (2012.01) |
| *G06Q 20/40* | (2012.01) |
| *G06Q 40/08* | (2012.01) |

(Continued)

(52) U.S. Cl.
CPC ........ *H04M 1/72533* (2013.01); *G06Q 20/20* (2013.01); *G06Q 20/202* (2013.01); *G06Q 20/32* (2013.01); *G06Q 20/322* (2013.01); *G06Q 20/3224* (2013.01); *G06Q 20/40* (2013.01); *G06Q 20/405* (2013.01); *G06Q 20/42* (2013.01); *G06Q 30/0277* (2013.01); *G06Q 40/08* (2013.01); *G06Q 40/12* (2013.12); *H04M 15/68* (2013.01); *H04W 4/50* (2018.02)

(58) Field of Classification Search
CPC ...... G06Q 20/20; G06Q 20/40; G06Q 20/202; G06Q 20/304; G06Q 20/322
USPC .......................................................... 705/16
See application file for complete search history.

(56) References Cited

U.S. PATENT DOCUMENTS

| | | |
|---|---|---|
| 8,355,805 B2 | 1/2013 | Ricket |
| 8,489,481 B2 | 6/2013 | Moore |

(Continued)

OTHER PUBLICATIONS

Botterweck, Goetz et al. Mobile home automation: merging mobile value added services and home automation technologies. Information Systems and eBusiness Management. Heidelberg. vol. 7. Issue 3. Jun. 2009. pp. 275-299.*

*Primary Examiner* — Florian M Zeender
*Assistant Examiner* — Fawaad Haider

(57) ABSTRACT

Embodiments described herein include methods and systems for remotely managing appliances, including enabling communication between a user of the appliance and third party systems. The third party systems can be any entity that has a relationship with the user of the appliance, such as a payment infrastructure handling incremental payments for the appliance, or a content management entity (for example, helping parents to control access to digital content available to children). In various embodiments, third party systems communicate with a device that is primarily a communication device under control of the user. In turn, the communication device conveys control information to the appliance.

9 Claims, 3 Drawing Sheets

(51) Int. Cl.
 G06Q 30/02 (2012.01)
 G06Q 40/00 (2012.01)
 H04W 4/50 (2018.01)

(56) References Cited

U.S. PATENT DOCUMENTS

| | | |
|---|---|---|
| 2011/0288992 A1 | 11/2011 | Needham |
| 2013/0132854 A1* | 5/2013 | Raleigh ................. G06F 3/0482 715/738 |
| 2013/0185194 A1 | 6/2013 | Moore |
| 2015/0180746 A1* | 6/2015 | Day, II .................... H04L 51/16 455/405 |

* cited by examiner

METHOD AND SYSTEM FOR REMOTE MANAGEMENT OF ACCESS TO DEVICES

RELATED APPLICATIONS

This application claims priority from U.S. Provisional Patent Application No. 62/101,576, which in incorporated herein by reference in its entirety.

BACKGROUND

User devices such as consumer electronics and home appliances are often sold as a single up-front purchase. For example, a television may be sold in a retail shop for $200 to a consumer, who then owns the television and takes it home. However, some people would prefer to pay for a device over time, for example with monthly payments of $20 per month, either for a limited number of payments, or for as long as the device is in use.

Several systems exist to help the seller continue to receive payments after the buyer has walked away with the television for other device or appliance). In one prior system, multiple hardware units are required to be connected to the device (or to multiple devices), including a unit for controlling the device, and another unit for managing usage (e.g., receiving and tracking payments). Yet other systems use a mobile communication network that facilitates electronic payment verification. However such systems also require the device itself to have mobile communication capability in order to be controlled.

It is desirable to have a method and system for remote management of devices that is easy and economical to deploy, and assists in assuring that required payments are timely made to the seller of the devices.

DETAILED DESCRIPTION

Embodiments described herein include a system that executes a device or appliance management method. As used herein "appliance" means any electronic device that might be typically purchased by a user. Appliances include, but are not limited to: a television, refrigerator, freezer, clothes washing machine, dish washing machine, electric stove, microwave oven, blender, food processor, air conditioner, stereo system, camera, video recorder, mobile phone handset, laptop computer, desktop computer, tablet computer, printer, DVD player, video projector, motorcycle, automobile, or airplane.

For purposes of describing the embodiments that are claimed, an example of controlling activating or deactivating an appliance based on whether scheduled payments are made. But this is only one example of the need for a third party (such as a payment entity that manages accounts on behalf of the seller of the user device) to easily and remotely control access to the appliance by the user, or even the manner of use of the appliance.

Embodiments of the invention enable a user to possess and use a device or appliance while another party can control the use of the device or appliance. This includes the other party determining when the device can be turned on or be unavailable to be turned on. This also includes the third party determining how the device can be used, for example what channels a television can receive, or how much power a generator can produce.

Figure 1:
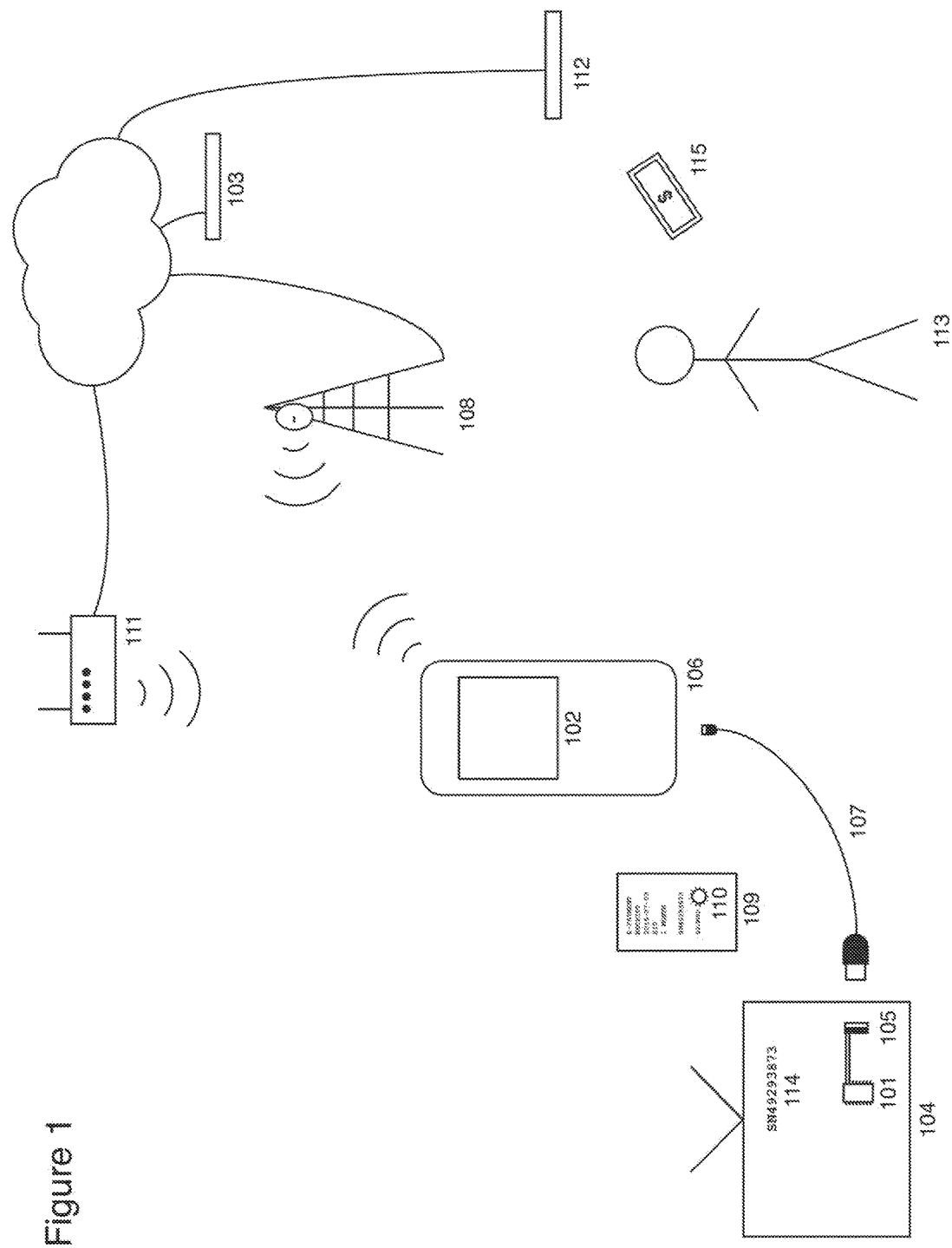
FIG. 1 is a block diagram of a remote device management system according to an embodiment.

FIG. 1 is a block diagram of an embodiment of a system for remote management of access to user appliances. An appliance 104 is activated or deactivated through an appliance management subsystem AMS 101. In an embodiment, the AMS is to hardware subsystem embedded in the appliance, such as a microcontroller or any other kind of integrated circuit (IC). In such an embodiment, the AMS 101 can be integrated into the core of the appliance so that the embedded system cannot be removed without disabling the appliance. When AMS 101 determines that the customer has paid, it activates the appliance for normal use. In other embodiments, the AMS 101 is connected after manufacture of the appliance and is not embedded. However, removal of the AMS 101 is detectable, and disabling of the appliance is a result of removal.

In an embodiment, the embedded system has no communication ability of its own except for a standard USB port 105, through which it can be connected to an internet capable device 106 through a USB cable 107. In one embodiment, the device 106 is a mobile phone that runs a software application (app) 102 which enables the device 106 to communicate with the AMS 101 according to methods described herein. In other embodiments, the internet capable device is as laptop computer, personal computer, tablet, PDA or any other such device.

According to an embodiment, the device 106 is a mobile phone that acts as a USB storage device. In this case, both the software app 102 and the embedded system can communicate with each other by reading and writing files on the USB storage device. In operation, the AMS 101 communicates an appliance identification (e.g., serial number) 114 to the software app 102. When the software app 102 determines that as payment has been made for the identified appliance, the software app 102 delivers a digital payment receipt 109 with a digital signature 110 to the AMS 101, and the AMS 101 activates the appliance.

In an embodiment, the software app 102 communicates using a mobile phone communication system, which may use 802.11 WiFi to communicate to a WiFi access point 111, or may use a GSM mobile data network such as 4G LTE, 3G, or 2G EDGE to communicate to a mobile carrier's signal tower 108. Either via WiFi or mobile data, the phone transmits data over the Internet to a third party infrastructure 103. The third party infrastructure 103 can be any Internet-based system with which the user or customer 113 establishes a relationship for the purpose of establishing control of the appliance 104 through wireless communication from the third party infrastructure 103 to the device 106, and from the device 106 to the AMS 101. In this disclosure, the third party infrastructure is described as a payment infrastructure, and control of the appliance is based on the status of the customer 113 payment account (which is conveyed from the third party infrastructure 103 to the user device 106, and then to the AMS 101). However, the basis of the relationship between the user or customer 113 and the third party infrastructure, and the events or motives that control the appliance could have nothing to do with payments. For example, the system can also be employed by parents to control various appliances used by children. But for purposes of illustration, the third party infrastructure 103 will be referred to as a payment infrastructure herein.

In an embodiment, the third party infrastructure (payment infrastructure) 103 is a software service running on computer servers which tracks when a payment is made for a particular appliance. The payment infrastructure 103 communicates with a payment provider 112 that collects cash or electronic payments 115 from customers 113. For example, the payment provider could be PayPal, a company that manages electronic payments; or the payment provider could be a mobile-money service such as M-Pesa; or the payment provider could be a bank or Western Union, which allows customers to deposit cash at a retail location and have that cash credited to an electronic account. The payment aspect is not considered a novel or limiting aspect of embodiments. Rather the event of payment causes the system to execute the remote management method; including activating or deactivating the appliance 104.

Figure 2:
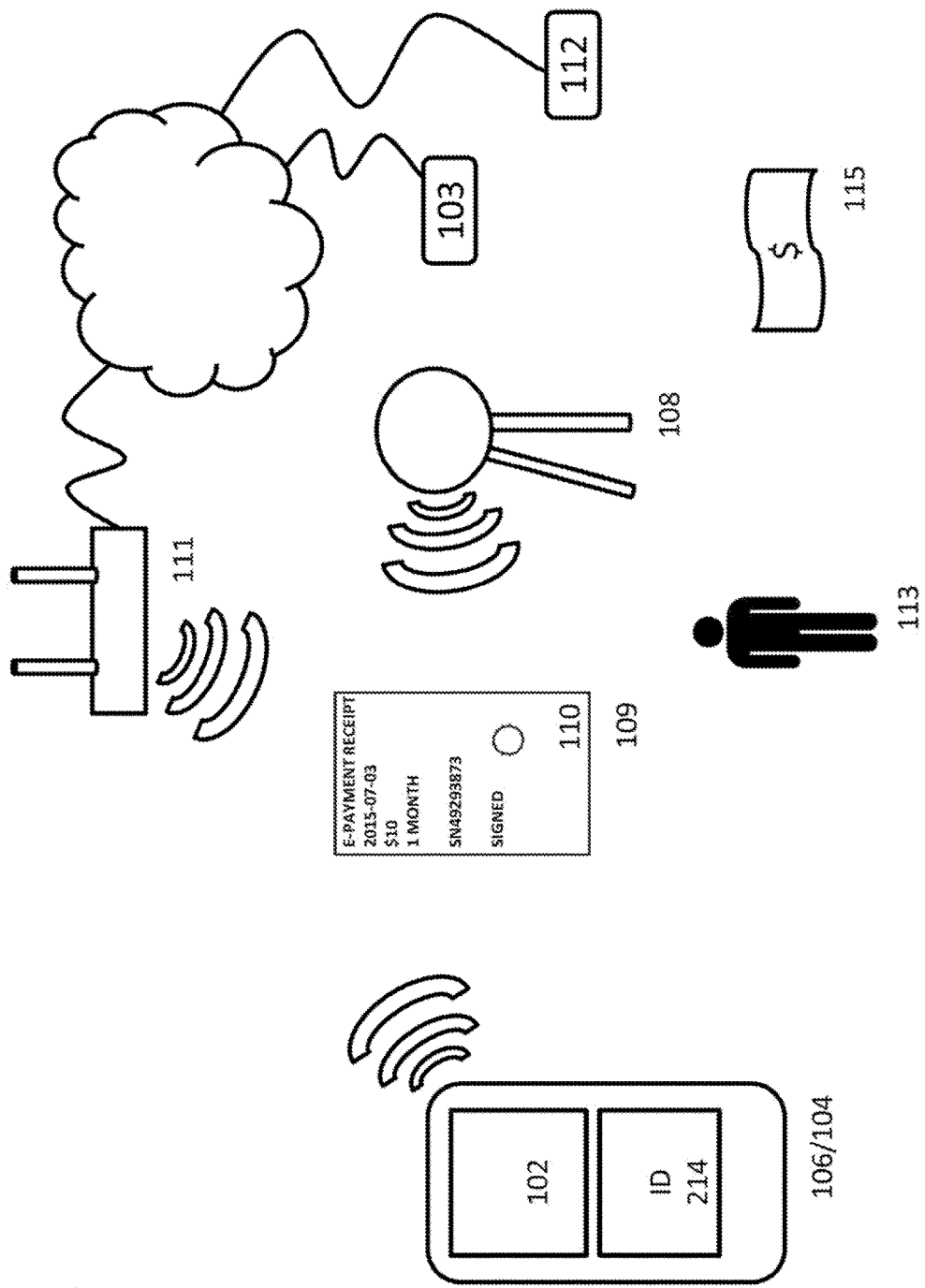
FIG. 2 is a block diagram of a remote device management system according to an embodiment.

FIG. 2 is a block diagram of an embodiment in which the device 106 is also the appliance 104. For example, device 106 can be a mobile phone that is managed remotely using software app 102 in a similar manner to that described with reference to FIG. 1. However, the software/hardware/firmware of the device 106/104 itself is used to activate or deactivate the device 106/104. Essentially, the AMS is software added to the operating system of the device 106. Again, when payments 115 are made by a user 113, and accepted by payment infrastructure 103, the payment infrastructure 103 delivers a digital payment receipt 109 with a digital signature 110 the software app 102, which verifies it, and controls the device 106/104 accordingly.

Figure 3:
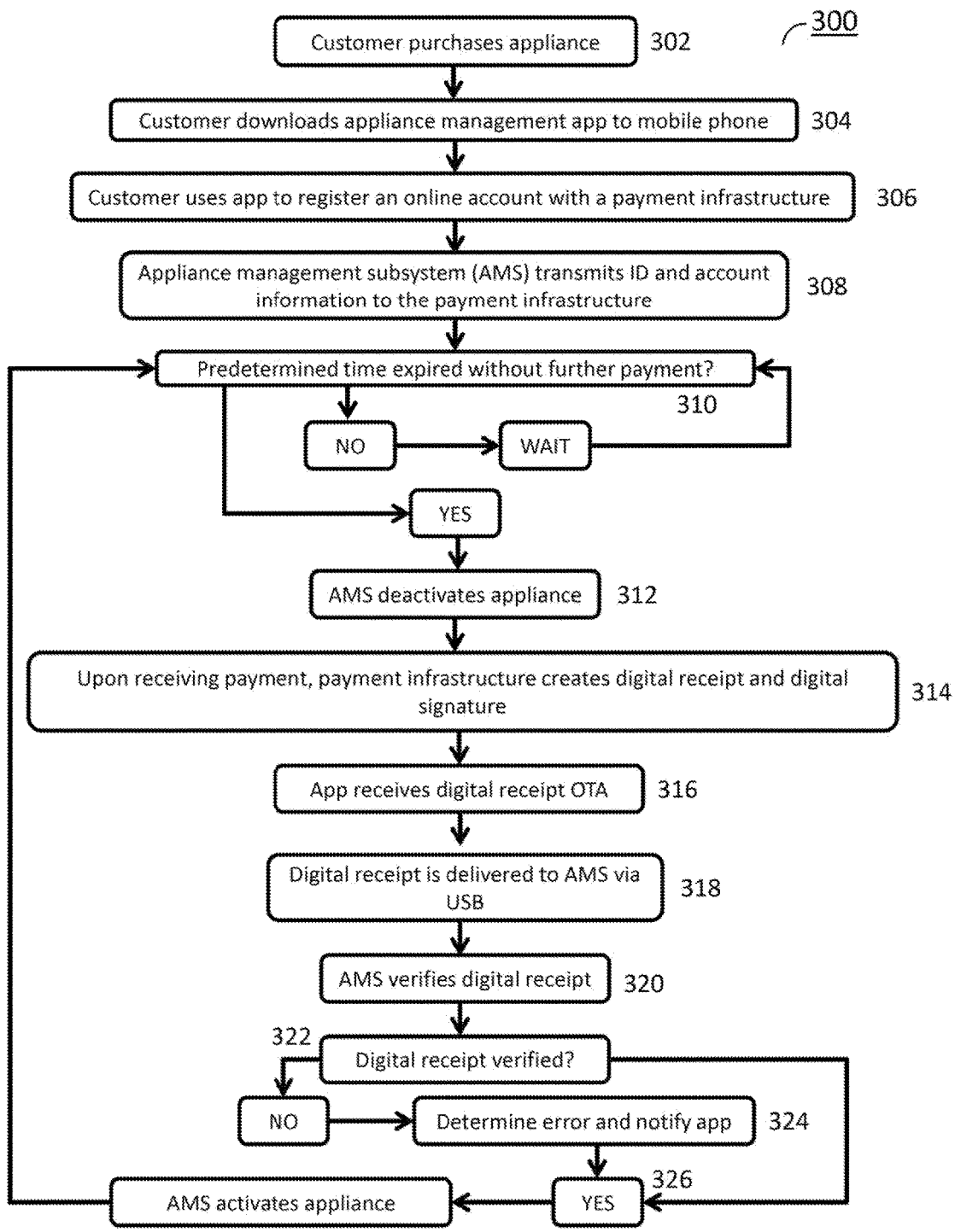
FIG. 3 is a flow diagram of a remote device management method according to an embodiment.

FIG. 3 is a flow diagram illustrating a method 300 for remote appliance management according to an embodiment like that of FIG. 1. At 302, a user or customer purchases an appliance from a vendor. At 304, the customer downloads the appliance management software app (102) to his or her device (106). At 306, the customer uses the software app to register an online account with a payment infrastructure (103). At 308, the AMS subsystem transmits an ID and account information to the using the device 106 (via a USB cable in one embodiment, and the device transmits the information to the payment infrastructure.

At 310, the software app determines whether a predetermined period of time has passed without the customer submitting further payment (after some initial payment upon acquiring the appliance. As an example, the period of time can be one month. If the period of time has not passed, the process continues to check for the expiration of the time period. If the period of time has passed without further payment, the AMS causes the appliance to be deactivated at 312. Deactivation means the appliance is not usable, or that certain predetermined features of the appliance are not usable. Deactivation can mean powering the appliance off, or disabling predetermined features.

At 314, if and when the payment is submitted to the payment infrastructure, the payment infrastructure creates a digital receipt including the ID information and a digital signature. The software app receives the digital receipt over-the-air at 316. At 318, the digital receipt is delivered to the AMS via USB cable. At 320, the AMS attempts to verify the digital receipt and determines (at 322) whether verification was successful. If the verification was not successful, the nature of the error is determined, and an error message is sent to the software app at 324.

If the verification of the digital receipt is successful, the AMS activates the appliance at 326. Activation means re-enabling any features or functions that were disabled at 312. The process then returns to 310 to wait for the expiration of the next time period.

In other embodiments, the time period can be set to be less than one month or more than one month. In other embodiments, the device 106 may communicate with the AMS via Bluetooth, WiFi, DTMF sounds, light modulation, 2D barcode or 3D barcode. The AMS 101 may include standard hardware as built originally in the appliance, but with customized firmware (software running on an embedded microprocessor).

Embodiments further include various user interfaces presented to the user via a mobile phone, or any other Internet connected device. The user interface can provide full information regarding the customer account, such as how much time is left before the appliance will be disabled. In addition, any information about the customer's financial account is available to the customer. This includes an overview of multiple devices that have been financed according to the embodiments described, and a single online point through which clients can manage their accounts and also manage their devices (e.g., turning the devices on and off).

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the internet and/or other computer networks via one or more data transfer protocols (e.g., HTTP, FTP, SMTP, etc.). When received, within a computer system via one or more computer-readable media, such data and/or instruction-based expressions of components and/or processes under the system described may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventors contemplate the various aspects of the systems and methods in any number of claim forms. For example, while only one aspect of the systems and methods may be recited as embodied in machine-readable medium, other aspects may likewise be embodied in machine-readable medium. Accordingly, the inventors reserve the right to add additional claims after filing the application to pursue such additional claim forms for other aspects of the systems and methods.

What is claimed is:

1. A method of remote management of appliances, comprising:
    an internet capable user device storing and executing an application for remote management of appliances, wherein the application comprises a user interface for a user of an appliance;
    the user of the appliance using the user interface to register an online account with a third party infrastructure, wherein the online account facilitates management of the appliance remotely;
    an appliance management system (AMS) receiving communications from the user device according to the application, including communications that direct the AMS to control the appliance, wherein the AMS is a component of the appliance, and wherein the application and the AMS communicate with each other by reading and writing files on a storage component of the user device, and the user device communicates with the third party infrastructure on behalf of the AMS, comprising the AMS determining whether a predetermined time has expired without receiving a confirmation of payment, wherein the AMS is chosen from one of an embedded subsystem in the appliance and a subsystem external to the appliance, and wherein the AMS controls the appliance accordingly, wherein controlling the appliance comprises causing the appliance to configure itself to perform certain functions at the behest of user and to not perform other functions at the behest of the user;
    the user device communicating with the third party-infrastructure, including receiving messages regarding payment for use of the appliance, wherein communicating with a third party infrastructure comprises communication via Bluetooth, WiFi, DTMF, light modulation, 2 dimensional barcode, 3 dimensional barcode, GSM, 4G LTE, 3G, 2G, and EGDE;
    the user device receiving a confirmation of payment for use of the appliance from the third party infrastructure;
    the user device communicating the confirmation of payment to the AMS;
    the AMS controlling the appliance based on the confirmation of payment, wherein controlling comprises deactivating the appliance, turning off power to the appliance, disabling one or more features of the appliance, and activating the appliance;
    wherein subsequent to the user registering the online account with the third party infrastructure, the AMS transmits an ID for the appliance to the third party infrastructure via the user device; and
    further comprising the user device sending the confirmation of payment to the AMS as an electronic payment receipt and digital signature.

2. The method of claim 1, wherein the device comprises one or more of a mobile phone, a personal computer, a tablet computer and a PDA.

3. The method of claim 1, wherein the appliance is one or more of a group comprising a television, a refrigerator, a freezer, a clothes washer, a dish washer, an oven, a stove, a microwave oven a blender, a food processor, an air conditioner, a stereo system, a camera, a video recorder, land line phone, a mobile phone, a laptop computer, a desktop computer, a tablet computer, a printer, a video projector, an automobile, and an airplane.

4. The method of claim 1, wherein the user device and the appliance are the same object, comprising a mobile phone.

5. A remote appliance management system, comprising:
    a communication device, comprising a wireless communication device associated with a user;
    an appliance management system (AMS) capable of communicating with the communication device, wherein the AMS is associated with an appliance, and wherein the AMS is chosen from one of an embedded subsystem in the appliance and a subsystem external to the appliance; and
    a third party system that is in electronic communication with the communication device, wherein the communication device receives communications from the third party system related to management of the appliance associated with the AMS, wherein communication comprises a method chosen from a group comprising Bluetooth, WiFi, DTMF, light modulation, 2 dimensional barcode, 3 dimensional barcode, GSM, 4G LTE, 3G, 2G, and EGDE, and wherein the communication device executes a process for controlling the appliance via communication with the AMS, the process comprising, the user device storing and executing an application for remote management of appliances, wherein the application comprises a user interface for a user of the appliance;

the user of the appliance using the user interface to register an online account with the third party infrastructure, wherein the online account facilitates management of the appliance remotely;

the AMS receiving communications from the user device according to the application, including communications that direct the AMS to control the appliance, wherein controlling the appliance comprises causing the appliance to configure itself to perform certain functions at the behest of user and to not perform other functions at the behest of the user, and wherein the application and the AMS communicate with each other by reading and writing files on a storage component of the user device, and the user device communicating with the third party infrastructure on behalf of the AMS;

the user device communicating with the third party infrastructure, including receiving messages regarding payment for use of the appliance, wherein the communication device comprises one or more of a mobile phone, a personal computer, a tablet computer and a PDA;

the user device receiving a confirmation of payment for use of the appliance from the third party infrastructure;

the user device communicating the confirmation of payment to the AMS;

the AMS controlling the appliance based on the confirmation of payment, wherein controlling comprises deactivating the appliance, turning off power to the appliance, disabling one or more features of the appliance, and activating the appliance; and wherein the process further comprises the AMS determining whether a predetermined time has expired without receiving a payment receipt, and wherein the AMS controls the appliance accordingly.

6. A non-transient computer readable medium having instruction stored thereon, that when executed in a processor cause an appliance management method to be executed, the method comprising:

an internet capable user device storing and executing an application for remote management of appliances, wherein the application comprises a user interface for a user of an appliance;

the user of the appliance using the user interface to register an online account with a third party infrastructure, wherein the online account facilitates management of the appliance remotely;

an appliance management system (AMS) receiving communications from the user device according to the application, including communications that direct the AMS to control the appliance, wherein controlling the appliance comprises causing the appliance to configure itself to perform certain functions at the behest of user and to not perform other functions at the behest of the user, wherein the AMS is a component of the appliance, and wherein the application and the AMS communicate with each other by reading and writing files on a storage component of the user device, and the user device communicates with the third party infrastructure on behalf of the AMS;

the user device communicating with the third party infrastructure, including receiving messages regarding payment for use of the appliance, wherein communicating with a third party infrastructure comprises communication via Bluetooth, WiFi, DTMF, light modulation, 2 dimensional barcode, 3 dimensional barcode, GSM, 4G LTE, 3G, 2G, and EGDE;

the user device receiving a confirmation of payment for use of the appliance from the third party infrastructure;

the user device communicating the confirmation of payment to the AMS;

the AMS controlling the appliance based on the confirmation of payment, wherein controlling comprises deactivating the appliance, turning off power to the appliance, disabling one or more features of the appliance, and activating the appliance; and wherein the method further comprises the AMS determining whether a predetermined time has expired without receiving a payment receipt, wherein the AMS is chosen from one of an embedded subsystem in the appliance and subsystem external to the appliance, and wherein the AMS controls the appliance accordingly.

7. The non-transient computer readable medium of claim 6, wherein the device comprises one or more of a mobile phone, a personal computer, a tablet computer and a PDA.

8. The non-transient computer readable medium of claim 6, wherein the appliance is one or more a group comprising a television, a refrigerator, a freezer, a clothes washer, a dish washer, an oven, a stove, a microwave oven a blender, a food processor, an air conditioner, a stereo system, a camera, a video recorder, land line phone, a mobile phone, a laptop computer, a desktop computer, a tablet computer, a printer, a video projector, an automobile, and an airplane.

9. The non-transient computer readable medium of claim 6, wherein the user device and the appliance are the same object, comprising a mobile phone.

* * * * *